United States Patent [19]

Kaga

[11] Patent Number: 5,196,077
[45] Date of Patent: Mar. 23, 1993

[54] PNEUMATIC RADIAL TIRE

[75] Inventor: Yukio Kaga, Atsugi, Japan

[73] Assignee: The Yokohama Rubber Co., Ltd., Tokyo, Japan

[21] Appl. No.: 517,131

[22] Filed: May 1, 1990

Related U.S. Application Data

[63] Continuation-in-part of Ser. No. 217,922, Jun. 17, 1988, abandoned.

[30] Foreign Application Priority Data

Oct. 27, 1986 [JP] Japan ............................. 61-253613

[51] Int. Cl.$^5$ ............................................ B60C 15/06
[52] U.S. Cl. ............................. 152/541; 152/539; 152/543; 152/546
[58] Field of Search ............... 152/539, 541, 543, 546, 152/552

[56] References Cited

U.S. PATENT DOCUMENTS

| | | | |
|---|---|---|---|
| 4,046,183 | 9/1977 | Takahashi et al. | 152/543 |
| 4,953,605 | 9/1990 | Kawamura et al. | 152/541 |

FOREIGN PATENT DOCUMENTS

| | | | |
|---|---|---|---|
| 0112808 | 7/1983 | Japan | 152/541 |
| 0110006 | 5/1988 | Japan | 152/541 |

Primary Examiner—Michael W. Ball
Assistant Examiner—Nancy T. Krawczyk
Attorney, Agent, or Firm—Nikaido, Marmelstein, Murray & Oram

[57] ABSTRACT

A pneumatic radial tire having a bead portion in which at least two reinforcing layers comprising a steel cord reinforcing layer and a fiber cord reinforcing layer are arranged outer to a turnup portion of a carcass layer and are covered with a rubber stock, the bead portion being capable of exhibiting an enhanced durability.

2 Claims, 8 Drawing Sheets

PNEUMATIC RADIAL TIRE

This application is a continuation-in-part application of application Ser. No. 217,922, filed on Jun. 17, 1988, now abandoned.

FIELD OF ART

The present invention relates to a structure of bead portions of pneumatic radial tires and, more particularly, a pneumatic radial tire improved in or relating to the durability of the bead portion.

BACKGROUND ART

Conventional pneumatic radial tires have such a structure of the bead portion in which a portion in the vicinity of respective ends of a carcass layer is folded back and turned up around the corresponding one of a pair of annular bead bundles from inside to outside of the tire, and in order to reinforce the vicinity of a turnup portion of the carcass layer located in the bead portion, more than two reinforcing layers are arranged to cover the turnup portion, and the tires have various combinations of the height of the end of the reinforcing layers and the height of the end of the turnup portion of carcass layer, measured from the bead base.

FIG. 9 of the accompanying drawings shows an example of conventional radial tires. In FIG. 9, the reference numeral 1 denotes a bead portion. A portion in the vicinity of respective ends of a carcass layer 2 comprising metal cords arranged at substantially 90° to the circumferential direction of the tire is folded back and turned up around or about the corresponding one of a pair of annular bead bundles 4 from inside to outside of the tire, to form a turnup portion 2a. Above the bead bundle 4 sandwiched between the turnup portion 2c and a main portion of the carcass layer 2 leading to the turnup portion, there are incorporated a lower bead filler 5a and an upper bead filler 5b. Also, externally to the turnup portion 2a, two reinforcing layers are disposed, which comprise a steel cord reinforcing layer 3a and a fiber cord reinforcing layer 3b. On the outer side of the fiber cord reinforcing layer 3b, a rubber layer 7 is disposed so as to protect an upper end portion of the reinforcing layer 3b. The height $h_1$ of the upper end of steel reinforcing layer 3a immediately adjacent the turnup portion 2a, measured from the bead base, is lower than the height $h_0$ of the upper end of the turnup portion 2a from the bead base, which in turn is lower than the height $h_2$ of the upper end of the fiber cord reinforcing layer 3b from the bead base ($h_1 < h_0 < h_2$). The elastic modulus at 100% elongation (hereinafter abbreviated as elastic modulus) of each of the lower bead filler 5a, the upper bead filler 5b and the rubber layer 7 is 4 to 7 MPa.

For radial tires of such conventional structuring, there have been proposed a variety of combinations of the end heights $h_1$ and $h_2$ of the reinforcing layers and the end height $h_0$ of the turnup portion 2a, but it still is frequently experienced that in the vicinity of the end of the turnup portion 2a or the end of each reinforcing layer, a separation trouble occurs, which tends to develop to reach a surface region of the bead portion to give rise to a crack damage.

Thus, in order to enhance the durability of the bead portion, various proposals have been made, for example such as to make optimum the height $h_0$ of the upper end of the turnup portion 2a of the carcass layer, to incorporate a further reinforcing layer, to define an optimal combination of the end heights of the turnup portion and the reinforcing layer and/or to incorporate a rubber layer between the turnup portion 2a of the carcass layer and an end portion of the steel cord reinforcing layer 3a. By way of an example, FIG. 10 of the accompanying drawings shows the structure of the bead portion according to Japanese patent application Kokai Publication No. 58-112808. In FIG. 10, a rubber stock 6 is disposed immediately inner to the fiber cord reinforcing layer 3b, and an upper end portion of each of the turnup portion 2a and the steel cord reinforcing layer 3a is covered with the rubber stock 6. The elastic modulus of the rubber stock 6 is higher than the elastic modulus of each of the lower bead filler 5a, the upper bead filler 5b and the rubber layer 7. However, the above proposals are directed mainly to the cancellation of the separation trouble between the turnup portion 2a of the carcass layer and the end portion of the steel cord reinforcing layer 3a, and although according to the proposed methods there have been brought about a remarkable result in respect of the intended suppression of the separation trouble between the turnup portion and the steel cord reinforcing layer, as a result thereof there has now come to be more noticeable than before a separation trouble in an end portion of the fiber reinforcing cord layer 3b, to which attention has not much been paid before.

The present invention has for its object to provide a pneumatic radial tire with which the generation of a separation trouble between the turnup portion of the carcass layer and an end portion of the steel cord reinforcing layer is suppressed and the separation trouble in an end portion of the fiber cord reinforcing layer is obviated so that the bead portion can exhibit a more fully satisfactory durability.

DISCLOSURE OF THE INVENTION

To attain the above object, the pneumatic radial tire according to the present invention consists in such a radial tire which has a bead portion in which a carcass layer is folded back and turned up about a bead bundle from inside to outside of the tire, at least two reinforcing layers comprising a steel cord reinforcing layer and a fiber cord reinforcing layer are arranged outer to a turnup portion of the carcass layer and, while the steel cord reinforcing layer immediately adjacent the turnup portion of the carcass layer has its upper end located lower to the upper end of the turnup portion, the fiber cord reinforcing layer has its upper end located higher to the upper end of the turnup portion and the upper end of the steel cord reinforcing layer adjacent the turnup portion, and is characterized in (1) that a rubber stock is disposed between an upper end portion of each of the turnup portion and the fiber cord reinforcing layer to contact and cover the upper end surface of the steel cord reinforcing layer and extend beyond the upper end portion of the fiber cord reinforcing layer, the rubber stock completely covers the upper end portions of the turnup portion and the fiber cord reinforcing layer and axially inner and outer sides of the fiber cord reinforcing layer, the rubber stock covering the axially outer side of the fiber cord reinforcing layer from the upper end of the fiber cord reinforcing layer to a location between the upper end of the steel cord reinforcing layer and the upper end of said turnup portion, (2) that at the location of the upper end of the fiber cord reinforcing layer, the rubber stock has a thickness b in the direction toward the fiber cord reinforcing layer which is 0.5 to 1.5 times the thickness a of the fiber cord reinforcing layer, (3) that at the location of the upper end of the turnup portion, the rubber stock has a thickness d between the carcass layer and the fiber cord reinforcing layer which is 1.0 to 4.0 times the cord diameter r of the cords of the steel cord reinforcing layer, (4) the upper end of the rubber stock and the upper end of the fiber cord reinforcing layer are spaced from each other by a distance c which is 1.0 to 15.0 times the thickness a of the fiber cord reinforcing layer; and (5) that the rubber stock has an elastic modulus which is higher than the elastic modulus of each of the rubber composition in the carcass layer and the rubber composition in the fiber cord reinforcing layer and is also higher than the elastic modulus of each of a bead filler adjacent to the inner side of the rubber stock and a rubber layer adjacent to the outer side of the rubber stock, and the elastic modulus of the rubber stock is within a range of 10 to 15 MPa.

DETAILED DESCRIPTION OF THE INVENTION

Figure 9:
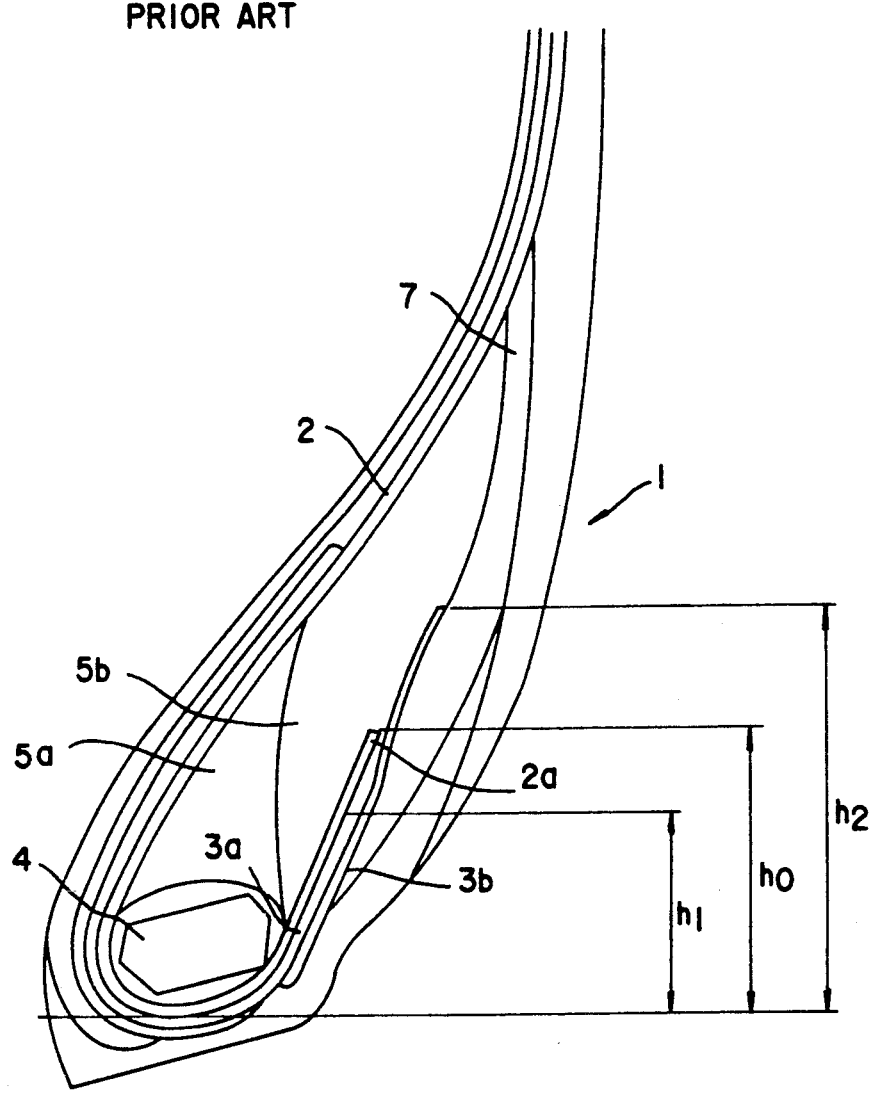
FIG. 9 is a sectional view, illustrating an example of bead portions in conventional pneumatic radial tires.

Now, a description in greater detail will be entered into the structural features of the present invention with reference to the drawings. Further, same members and parts as in FIG. 9 are shown by same reference numerals.

Figure 1:
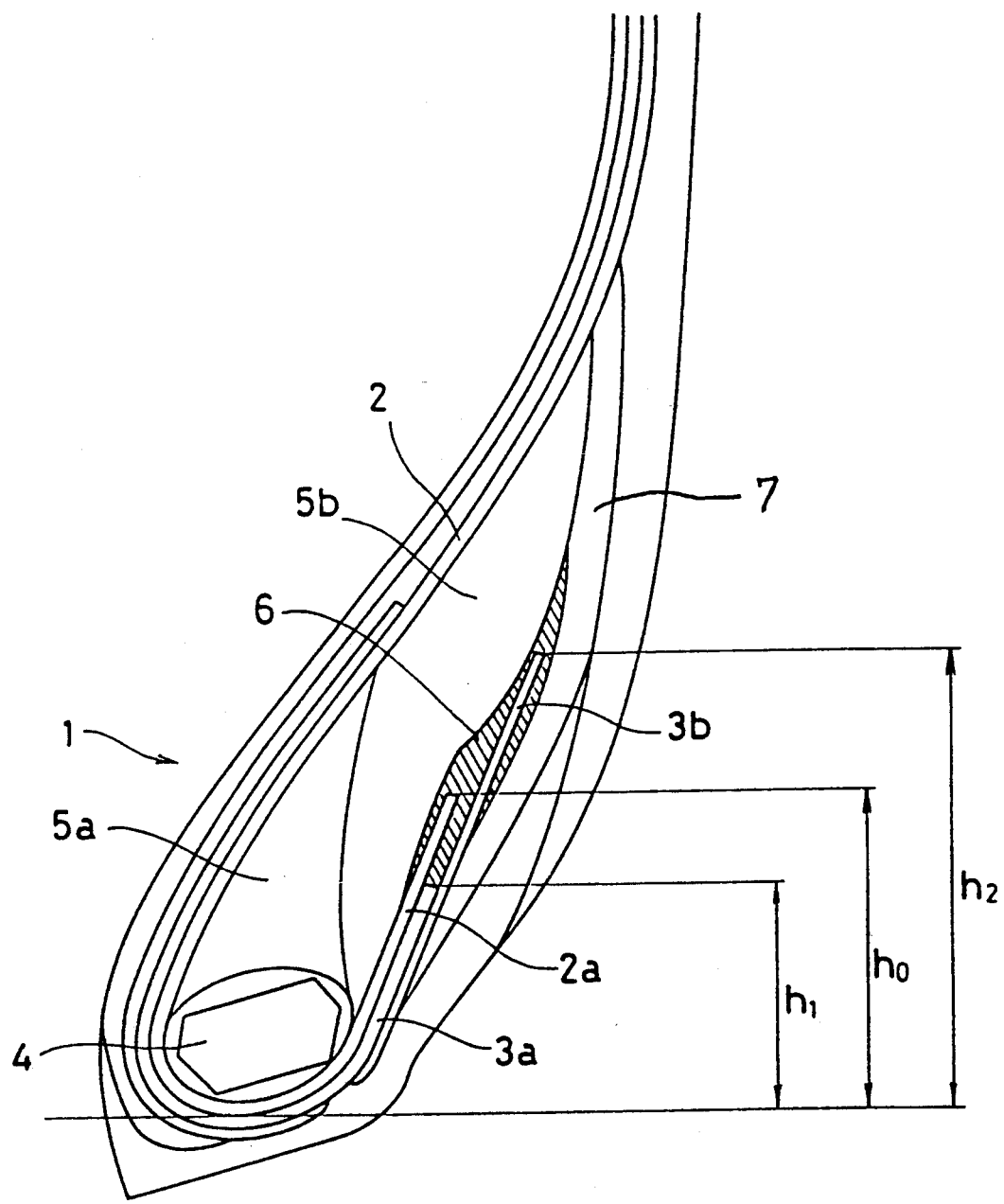
FIG. 1 is a sectional view, illustrating an example of bead portions in pneumatic radial tires according to the present invention.
Figure 2:
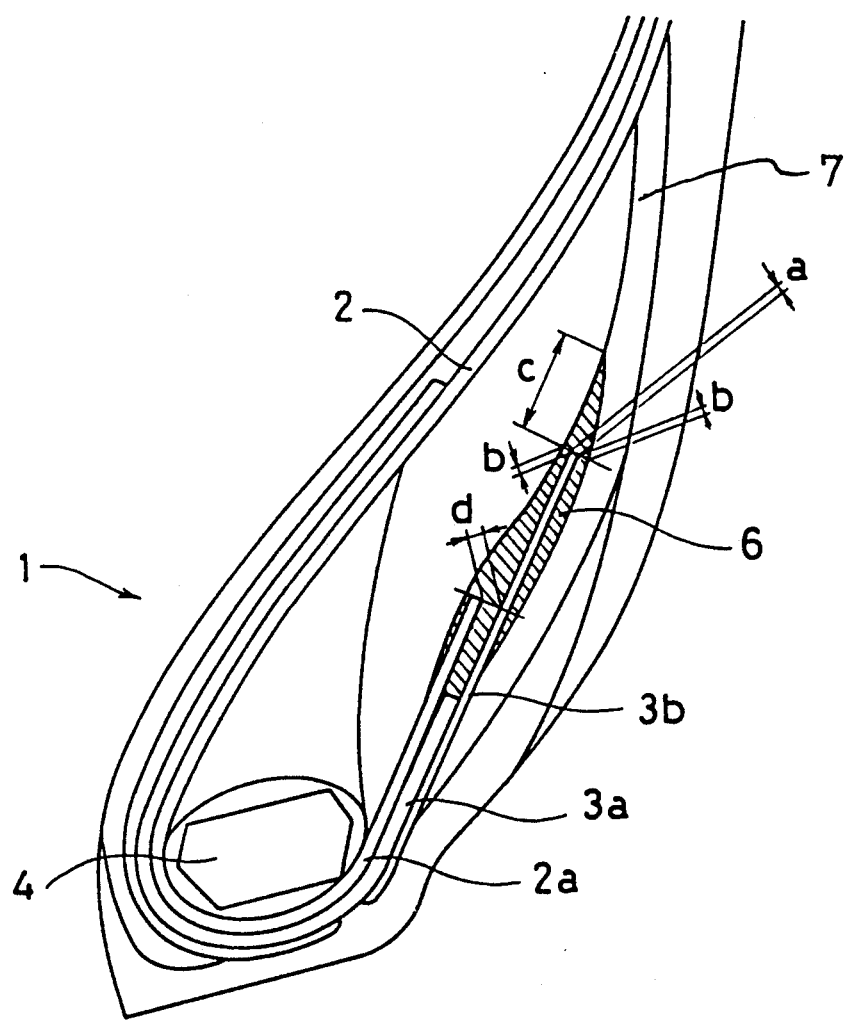
FIG. 2 is a view, showing essential portions of FIG. 1.

FIG. 1 is an explanatory view, showing in section an example of bead portions of pneumatic radial tires according to the present invention, and FIG. 2 is an explanatory view, showing essential parts in FIG. 1. According to the present invention, the following requirements are defined with reference to such FIG. 1 and FIG. 2.

(1) A rubber stock 6 is disposed between an upper end portion of each of the turnup portion 2a and the steel cord reinforcing layer 3a and the fiber cord reinforcing layer 3b covering the upper end portions of the turnup portion 2a and the steel cord reinforcing layer 3a, and in addition, the rubber stock 6 is arranged to cover the upper end of the fiber cord reinforcing layer 3b.

This requirement is made for reinforcing the upper end portions in reference. The rubber stock is a layer of a rubber composition comprising any rubber of such as natural rubbers and styrene-butadiene copolymer rubbers, and additives such as carbon black, sulfur and so forth.

(2) At the location of the upper end of the fiber cord reinforcing layer 3b, the thickness b of the rubber stock 6 in the direction toward the fiber cord reinforcing layer 3b is 0.5 to 1.5 times the thickness a of the fiber cord reinforcing layer 3b [b=(0.5 to 1.5)a].

With a thickness b smaller than 0.5 times the thickness a, the stress and strain tending to concentrate at the upper end portion of the fiber cord reinforcing layer 3b cannot be sufficiently suppressed and a sufficient effect of suppressing the separation cannot be obtained. On the other hand, if the thickness b exceeds 1.5 times the thickness a, then in the vicinity of the upper end portion of the fiber cord reinforcing layer a desirable volumetric balance cannot be obtained between the rubber stock and other parts or members, and an unnecessary flow of rubber tends to be induced to generate other troubles than the separation.

(3) The thickness d of the rubber stock 6 between the carcass layer and the fiber cord reinforcing layer 3b, at the upper end of the turnup portion 2a, is 1.0 to 4.0 times the cord diameter r of cords in the steel cord reinforcing layer 3a (where there are any lap cords in the reinforcing layer, the cord diameter r means that of such other cords than the lap cords by which the cord strength is mainly born).

If the thickness d is smaller than 1.0 time the cord diameter r, the stress and strain tending to concentrate at the upper end portion of the turnup portion 2a cannot be sufficiently suppressed, so that a separation tends to be induced, while if the thickness d is greater than 4.0 times the cord diameter r, on the other, the fiber cord reinforcing layer 3b tends to undergo waving and a heat build-up to promote development of the separation.

(4) The rubber stock 6 has an elastic modulus which is higher than the elastic modulus of each of the rubber composition in the carcass layer 2 (hereinafter called coat rubber A) and the rubber composition in the fiber cord reinforcing layer 3b (hereinafter called coat rubber B) and is also higher than the elastic modulus of each of a bead filler (the upper bead filler 5b) adjacent to the inner side of the rubber stock 6 and a rubber layer 7 adjacent to the outer side of the rubber stock 6, and the elastic modulus of the rubber stock 6 is within a range of 10 to 15 MPa. The elastic modulus of the upper bead filler 5b is equal to the elastic modulus of the lower bead filler 5a. The elastic modulus of each of the lower bead filler 5a, the upper bead filler 5b and the rubber layer 7 is 4 to 7 MPa.

Herein, the elastic modulus means values determined by a viscoelastic spectrometer under the conditions of a temperature of 20° C., a strain of 10% ±2%, and 20 Hz.

When the elastic modulus $E_1$ of the rubber stock 6 is lower than the elastic modulus $E_1$ of each of the coat rubbers A and B, an upper end portion of the turnup portion 2a is permitted to undergo a relatively great extent of movement, and a concentration of strain tends to occur at the end portion, whereby generation of separation at the end portion cannot be avoided.

On the other hand, if the elastic modulus $E_1$ of the rubber stock 6 is too high in comparison to the elastic modulus $E_1$ of each of the coat rubbers A and B, an interlayer separation is prone to occur in an upper bead filler 5b. In view of the above, the elastic modulus $E_1$ of the rubber stock 6 should necessarily be within a range of 10 to 15 MPa.

Also, according to the present invention, in order to enhance the adhesion between the rubber stock 6 and the carcass cords, preferably the rubber stock 6 is made containing a metallic salt of cobalt in an amount of 0.1 to 0.4 parts by weight in terms of the amount of cobalt (per 100 parts by weight of the rubber in the rubber stock 6).

Moreover, it is preferable according to the present invention that the upper end of the rubber stock 6 and the upper end of the fiber cord reinforcing layer 3b are spaced from each other by a distance c which is 1.0 to 15.0 times the thickness a of the fiber cord reinforcing layer 3b.

Examples will be shown in the following.

EXAMPLES

Figure 10:
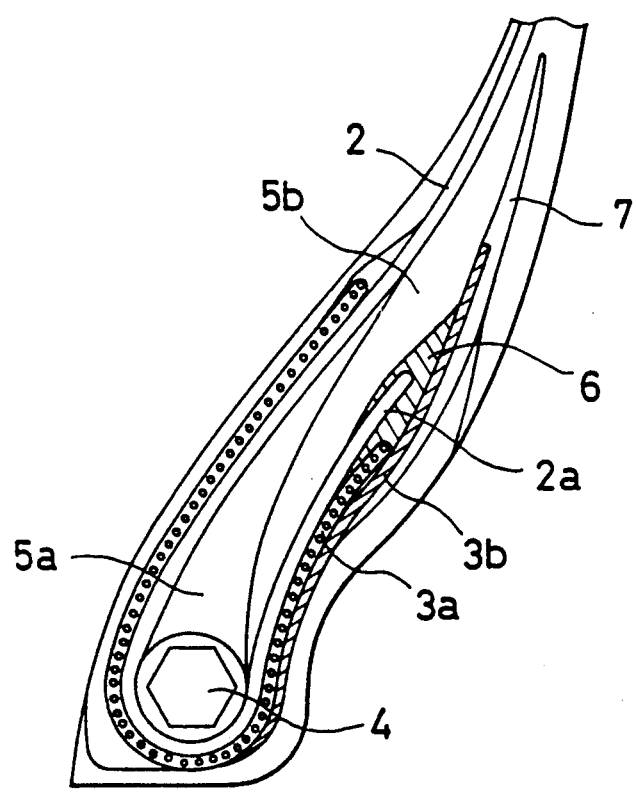
FIG. 10 is a sectional view, illustrating another example of bead portions in conventional pneumatic radial tires.

In tires of a size of 11R 22.5, having the bead portion structure shown in FIGS. 9 and 10 and the bead portion structure shown in FIGS. 1 and 2, the end height $h_0$ of the turnup portion 2a, the end height $h_1$ of the steel cord reinforcing layer 3a and the end height $h_2$ of the fiber cord reinforcing layer 3b were set as follows: $h_0 = 40$ mm, $h_1 = 30$ mm and $h_2 = 60$ mm. Also, the cord diameter $r_1$ of the cords in the carcass layer 2 and its turnup portion 2a was set as $r_1 = 1.34$ mm, the elastic modulus $E_1$ of the coat rubber A in the carcass layer 2 and its turnup portion 2a was set as $E_1 = 8.0$ MPa as found by a viscoelastic spectrometer, the cord diameter r of cords in the steel cord reinforcing layer 3a immediately adjacent the turnup portion 2a was set as $r = 0.95$ mm, the elastic modulus of the cords was set to be 140000 MPa. Further, the elastic modulus of the cords of the fiber cord reinforcing layer 3b was set to be 2750 MPa, the elastic modulus $E_1$ of the coat rubber of the fiber cord reinforcing layer 3b was set to be 6.8 MPa as found in the same manner as in the case of the coat rubber A above.

The thickness d of the rubber stock 6 at the upper end of the turnup portion 2a in FIG. 1 was set as $d = 2.63$ r, and there were built testing tires having different values of the elastic modulus of the rubber stock 6, the content of a metallic salt of cobalt and the elastic modulus $E_1$ of the coat rubber of the carcass layer 2 and the turnup portion 2a as shown in the below Table 1.

Moreover, with the thickness d of the rubber stock 6 at the upper end of the turnup portion 2a varied as shown in Table 2 below, testing tires were built.

Evaluations of the durability of the bead portion were made by finding the distance in which, in an indoor drum test, each testing tire was run to generate a visible crack of a size of 5 mm or above on the bead surface. Further, the results of evaluations are shown in terms of indices with the distance determined of the conventional tire shown in FIG. 9 taken as reference value, 100.

TABLE 1

| Tire | Elastic Modulus $E_1$ of Carcass Coat Rubber (MPa) | Rubber Stock Yes or No | d/r | Elastic Modulus $E_1$ (Mpa) | Content of Cobalt (parts by weight) | Durability of Bead Portion (index) |
|---|---|---|---|---|---|---|
| A | 8.0 | No | — | — | — | 100 |
| B | 8.0 | Yes | 2,63 | 6.5 | 0.0 | 98 |
| C | 8.0 | Yes | 2,63 | 10.0 | 0.1 | 160 |
| D | 12.0 | Yes | 2,63 | 10.0 | 0.1 | 285 |
| E | 8.0 | Yes | 2,63 | 12.7 | 0.2 | 304 |
| F | 8.0 | Yes | 2,63 | 14.3 | 0.3 | 300 |
| G | 8.0 | Yes | 2,63 | 14.8 | 0.4 | 295 |
| H | 8.0 | Yes | 2,63 | 16.0 | 0.5 | 220 |

Yes: A rubber stock was incorporated.
No: No rubber stock was incorporated.

TABLE 2

| Tire | Elastic Modulus $E_1$ of Carcass Coat Rubber (MPa) | Rubber Stock Yes or No | d/r | Elastic Modulus $E_1$ (Mpa) | Content of Cobalt (parts by weight) | Durability of Bead Portion (index) |
|---|---|---|---|---|---|---|
| K | 8.0 | Yes | 0.8 | 12.7 | 0.2 | 185 |
| L | 8.0 | Yes | 1.0 | 12.7 | 0.2 | 300 |
| E | 8.0 | Yes | 2.63 | 12.7 | 0.2 | 304 |
| M | 8.0 | Yes | 4.0 | 12.7 | 0.2 | 280 |
| N | 8.0 | Yes | 4.2 | 12.7 | 0.2 | 230 |

Note:
Durability of Bead Portion: Shown by indices with the value of the conventional tire (Tire A in the above Table 1) taken as 100.
Yes: A rubber stock was incorporated.
No: No rubber stock was incorporated.

Figure 3:
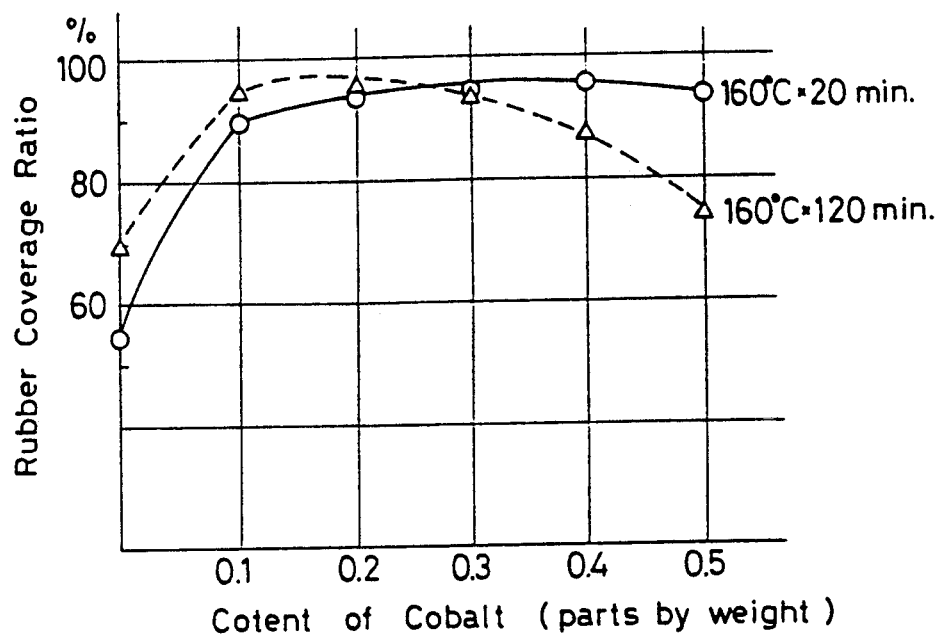
FIG. 3 shows the relationship between the rubber coverage ratio of the rubber stock and the content of cobalt.
Figure 4:
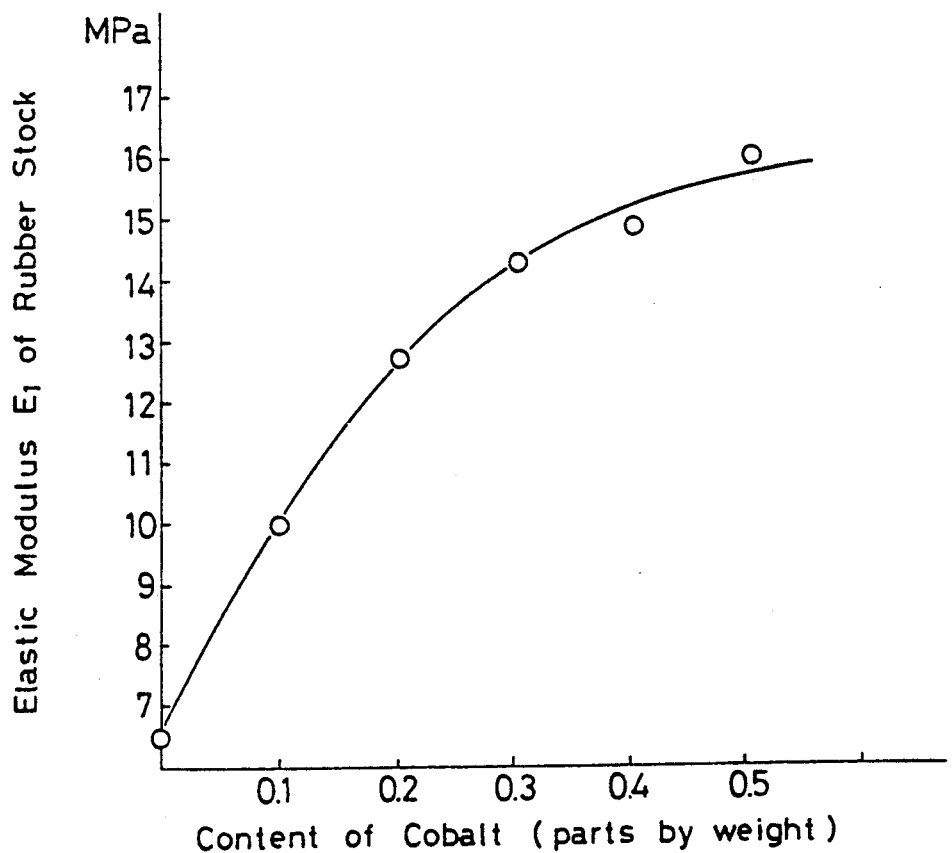
FIG. 4 shows the relationship between the elastic modulus of the rubber stock and the content of cobalt.
Figure 5:
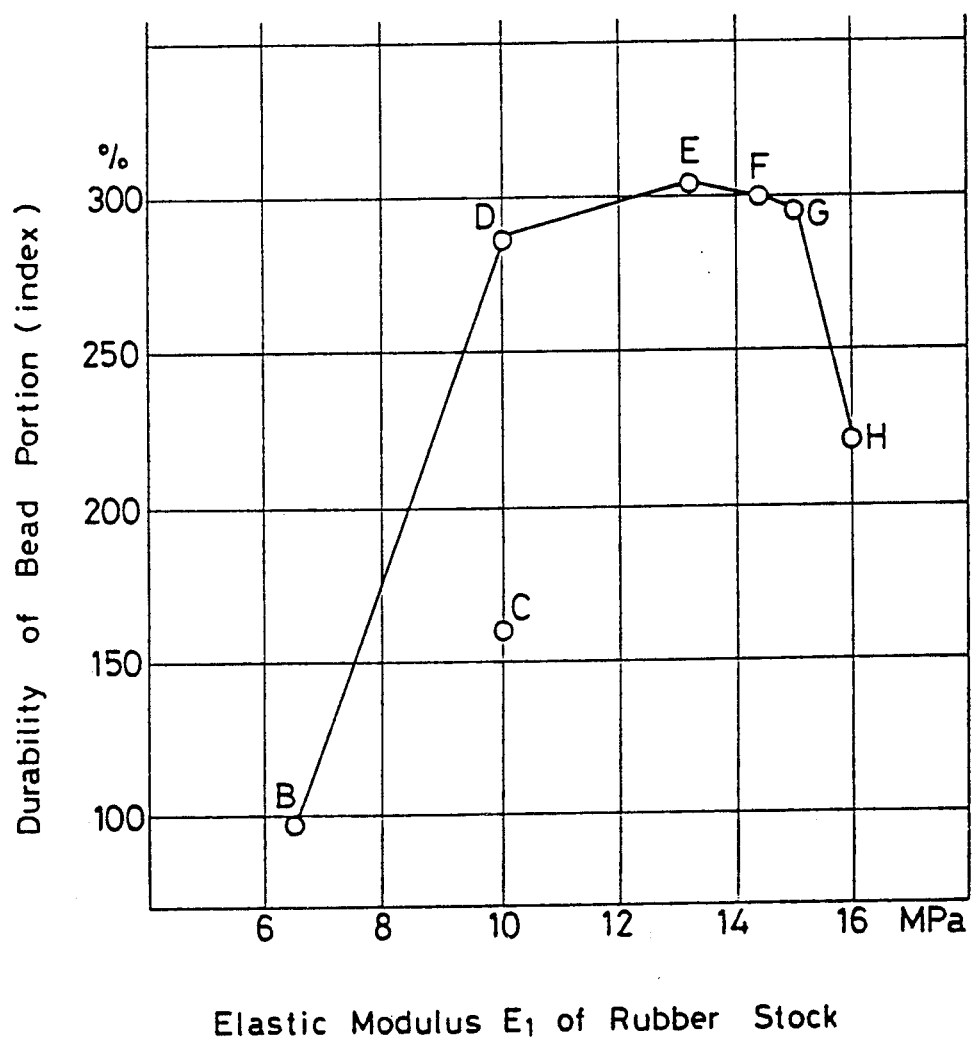
FIG. 5 shows the relationship between the elastic modulus of the rubber stock and the durability of the bead portion.
Figure 6:
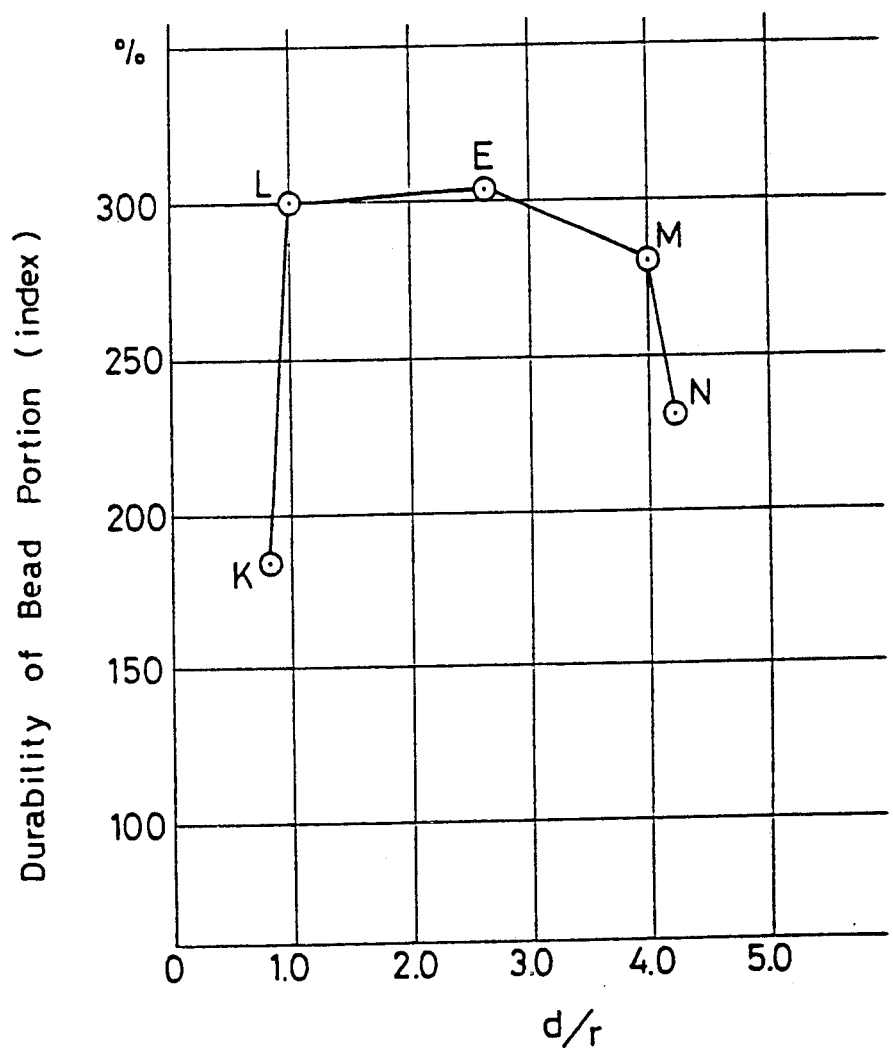
FIG. 6 shows the relationship between the ratio (d/r) of the thickness d of the rubber stock to the cord diameter r of cords in the steel cord reinforcing layer 3a and the durability of the bead portion.

FIG. 3 shows the relationship between the rubber coverage ratio of the rubber stock and the content of cobalt (in parts by weight per 100 parts by weight of rubber in the rubber stock). In FIG. 3, the circle mark (O)) represents cases of rubber stocks vulcanized at 160° C. for 20 minutes, while the triangle mark (Δ) represents the cases of rubber stocks vulcanized at 160° C. for 120 minutes. Further, in FIG. 4 there is shown the relationship between the elastic modulus of the rubber stock and the content of cobalt (parts by weight per 100 parts by weight of the rubber in the rubber stock), in FIG. 5 there is shown the relationship between the elastic modulus of the rubber stock and the durability of the bead portion, and in FIG. 6 there is shown the relationship between the ratio (d/r) of the thickness d of the rubber stock 6 at the upper end of the turnup portion 2a to the cord diameter r of the cords in the steel cord reinforcing layer 3a and the durability of the bead portion.

From the results of evaluations, it is seen that when the rubber stock 6 is satisfactory in view of the following, the durability of the bead portions of tires can be enhanced to 300% or more of the durability of conventional tires, even under heavy load conditions.

(1) Where the thickness d of the rubber stock 6 at the location of the end of the turnup portion 2a is smaller than 1.0 time the cord diameter r of the cords in the steel cord reinforcing layer 3a, the concentration of stress and strain at the end portion of the turnup portion 2a cannot be sufficiently relieved and a separation tends to be induced, so that no remarkable enhancement of the durability of the bead portion was obtained.

Then, where the thickness d exceeds 4.0 times the diameter r, the generation of a separation is promoted on account of that the fiber cord reinforcing layer 3b undergoes a waving at the location of the end of the turnup portion 2a and that a heat build-up takes place due to an increase in the thickness of the rubber stock (Table 2).

Thus, the thickness d at the end portion of the turnup portion 2a should necessarily be within a range of 1.0 to 4.0 times the above-mentioned cord diameter r.

(2) When the elastic modulus $E_1$ of the rubber stock 6 (determined by a viscoelastic spectrometer) is lower than the elastic modulus $E_1$ of the coat rubber of the carcass layer 2 and its turnup portion 2a (determined by the viscoelastic spectrometer), the concentration of stress and strain at the end portion of the turnup portion 2a cannot be sufficiently relieved and the durability of the bead portion cannot be sufficiently high. Thus, the elastic modulus of the rubber stock 6 should necessarily be higher than the elastic modulus of the coat rubber A in the carcass layer 2 and its turnup portion 2a (Table 1 and FIG. 1).

(3) When the rubber stock 6 does not contain a metallic salt of cobalt, the durability of the bead portion cannot be sufficiently high (Table 1).

(4) When the rubber stock 6 does not contain the metallic salt of cobalt, even if it has an elastic modulus $E_1$ which is higher than the elastic modulus $E_1$ of the coat rubber A in the carcass layer 2 and the turnup portion 2a, the durability of the bead portion is lower in comparison to the case of a rubber stock 6 containing the metallic salt of cobalt (Table 1 and FIG. 1).

(5) Even if the rubber stock 6 contains the metallic salt of cobalt, the durability of the bead portion cannot be sufficiently high if the rubber stock 6 has an elastic modulus $E_1$ which is lower than the elastic modulus $E_1$ of the coat rubber A in the carcass layer 2 and the turnup portion 2a.

(6) Even if the rubber stock 6 contains the metallic salt of cobalt, the durability of the bead portion cannot be sufficiently high if the content of the metallic salt of cobalt is such with which the rubber coverage ratio does not reach 90% in the cases of an over-vulcanization (FIG. 3 and FIG. 1).

(7) When at the location of the end of the turnup portion 2a, the rubber stock 6 has a thickness d within the preferred range stated in the above paragraph (1), has an elastic modulus $E_1$ determined by the viscoelastic spectrometer within a range of 10 to 15 MPa and contains 0.1 to 0.4 parts by weight of a metallic salt of cobalt based on the amount of cobalt (per 100 parts by weight of the rubber in the rubber stock), it is feasible to attain such a considerable enhancement of the durability of the bead portion as being nearly up to 300% of the durability of the bead portion of tires having conventional bead structures.

Figure 7:
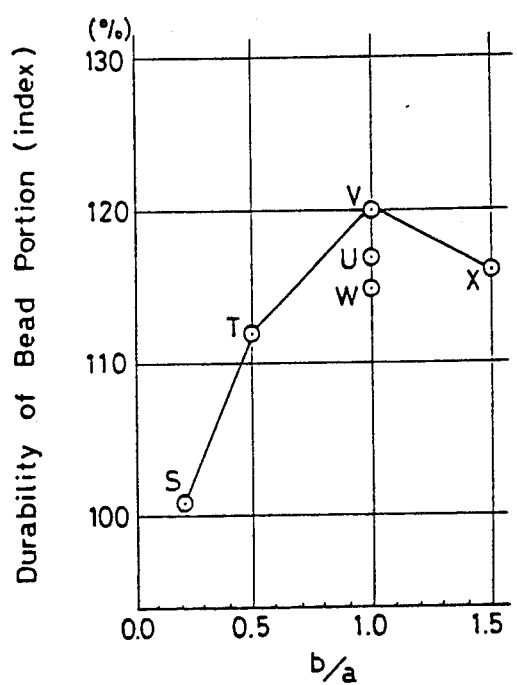
FIG. 7 shows the relationship between the ratio (b/a) of the thickness b of the rubber stock to the thickness a of the fiber cord reinforcing layer and the durability of the bead portion.
Figure 8:
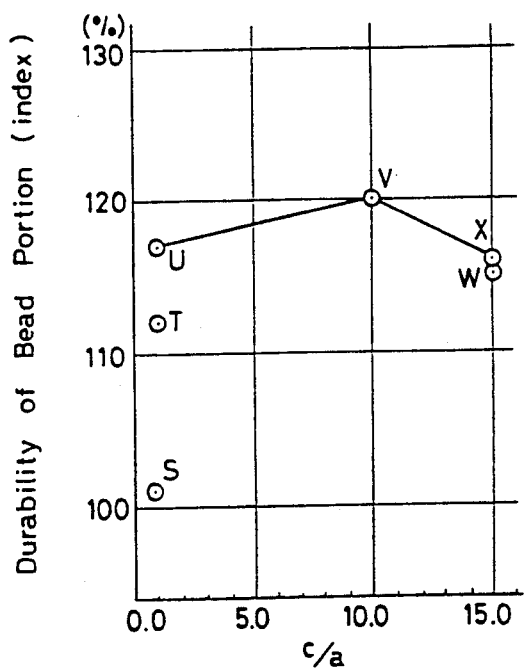
FIG. 8 shows the relationship between the ratio (c/a) of the distance c between the upper end of the rubber stock and the upper end of the fiber cord reinforcing layer to the thickness a of the fiber cord reinforcing layer and the durability of the bead portion.

Then, shown in the below Table 3 and FIGS. 7 and 8 are the relationship between the durability of the bead portion and the ratio (b/a) of the thickness b of the rubber stock 6 in the direction toward the fiber cord reinforcing layer 3b at the end of the fiber cord reinforcing layer 3b to the thickness a of the fiber cord reinforcing layer 3b, which ratio was varied, and the relationship between the durability of the bead portion and the ratio (c/a) of the distance c between the upper end of the rubber stock 6 and the upper end of the fiber cord reinforcing layer 3b to the thickness a of the fiber cord reinforcing layer 3b, which ratio was also varied.

From the Table 3 and FIG. 7, it is seen that the ratio b/a should desirably be from 0.5 to 1.5, and from the Table 3 and FIG. 8, it is seen that the ratio c/a should desirably be from 1.0 to 15.0. Moreover, it is also seen from Table 3 that in the case of the Tire E having a bead portion structure as shown in FIG. 10, in which the upper end of the fiber cord reinforcing layer 3b is covered with the rubber layer 7, a separation tends to occur at the upper end of the fiber cord reinforcing layer 3b and the durability of the bead portion is poor in this case.

TABLE 3

| Tire | Elastic Modulus $E_1$ of Carcass Coat Rubber (MPa) | Rubber Stock Yes or No | d/r | Elastic Modulus $E_1$ (MPa) | Content of Cobalt (parts by weight) | b/a | c/a | Durability of Bead Portion (index) |
|---|---|---|---|---|---|---|---|---|
| E | 8.0 | Yes | 2.63 | 12.7 | 0.2 | — | — | 100 |
| S | 8.0 | Yes | 2.63 | 12.7 | 0.2 | 0.2 | 1.0 | 101 |
| T | 8.0 | Yes | 2.63 | 12.7 | 0.2 | 0.5 | 1.0 | 112 |
| U | 8.0 | Yes | 2.63 | 12.7 | 0.2 | 1.0 | 1.0 | 117 |
| V | 8.0 | Yes | 2.63 | 12.7 | 0.2 | 1.0 | 10.0 | 120 |
| W | 8.0 | Yes | 2.63 | 12.7 | 0.2 | 1.0 | 15.0 | 115 |
| X | 8.0 | Yes | 2.63 | 12.7 | 0.2 | 1.5 | 15.0 | 116 |

Yes: The rubber stock is incorporated.
No: The rubber stock is not incorporated.

Capability of Exploitation of the Invention in Industry

As described above, according to the present invention it is feasible to at the same time suppress a separation trouble at an upper end portion of the turnup portion of a carcass layer and a separation trouble at an end portion of a fiber cord reinforcing layer in pneumatic radial tires, and also it can be expected to considerably enhance the durability of the tire bead portion even under heavy load conditions and long-use conditions in which tires may be used in a regenerated state, in comparison to conventional tires. Accordingly, the present invention can greatly contribute to various tires such as passenger car tires, heavy duty tires and so forth.

I claim:

1. A pneumatic radial tire having a bead portion in which a carcass layer is folded back and turned up around a bead bundle from inside to outside of the tire, at least two reinforcing layers comprising a steel cord reinforcing layer and a fiber cord reinforcing layer are arranged outer to a turnup portion of the carcass layer and, while the steel cord reinforcing layer immediately adjacent the turnup portion of the carcass layer has its upper end located lower to the upper end of the turnup portion, the fiber cord reinforcing layer has its upper end located higher to the upper end of the turnup portion and the upper end of the steel cord reinforcing layer adjacent the turnup portion; wherein (1) a rubber stock is disposed between an upper end portion of each of said turnup portion and said fiber cord reinforcing layer to contact and cover the upper end surface of said steel cord reinforcing layer and extend beyond the upper end portion of said fiber cord reinforcing layer, the rubber stock completely covers the upper end portions of the turnup portion and said fiber cord reinforcing layer and axially inner the rubber stock completely covers the side of the fiber cord reinforcing layer; (2) that at the location of the upper end of said fiber cord reinforcing layer, the rubber stock has a thickness b in the direction toward the fiber cord reinforcing layer which is 0.5 to 1.5 times the thickness a of the fiber cord reinforcing layer; (3) that at the location of the upper end of said turnup portion, the rubber stock has a thickness d between the carcass layer and the fiber cord reinforcing layer which is 1.0 to 4.0 times the cord diameter r of the cords of the steel cord reinforcing layer; (4) the upper end of the rubber stock and the upper end of the fiber cord reinforcing layer are spaced from each other by a distance c which is 1.0 to 15.0 times the thickness a of the fiber cord reinforcing layer; and (5) that the rubber stock has an elastic modulus which is higher than the elastic modulus of each of the rubber composition in the carcass layer and the rubber composition in the fiber cord reinforcing layer and is also higher than the elastic modulus of each of a bead filler adjacent to the inner side of the rubber stock and a rubber layer adjacent to the outer side of the rubber stock, and the elastic modulus of the rubber stock is within a range of 10 to 15 MPa.

2. The pneumatic radial tire as claimed in claim 1, wherein the rubber stock contains 0.1 to 0.4 parts by weight of a metallic salt of cobalt in terms of the amount of cobalt per 100 parts by weight of rubber.

* * * * *

UNITED STATES PATENT AND TRADEMARK OFFICE
CERTIFICATE OF CORRECTION

PATENT NO. : 5,196,077
DATED : March 23, 1993
INVENTOR(S) : Yukio Kaga

It is certified that error appears in the above-indentified patent and that said Letters Patent is hereby corrected as shown below:

On the title page, Item [30], include -- October 27, 1987 [JP] Japan.....PCT/JP87/00822 --.

Signed and Sealed this

Fourth Day of January, 1994

Attest:

BRUCE LEHMAN

*Attesting Officer*     *Commissioner of Patents and Trademarks*